United States Patent
Buttriss

[11] 3,808,887
[45] May 7, 1974

[54] LIQUID LEVEL MONITOR

[75] Inventor: Albert T. Buttriss, Westlake, Ohio

[73] Assignee: Eaton Corporation, Cleveland, Ohio

[22] Filed: Feb. 29, 1972

[21] Appl. No.: 230,276

[52] U.S. Cl.................. 73/293, 73/327, 340/244 R
[51] Int. Cl............................................. G01f 23/00
[58] Field of Search...................... 73/293, 313, 327;
 116/118 R; 340/244 R, 380; 317/235 N

[56] References Cited
UNITED STATES PATENTS

| | | | |
|---|---|---|---|
| 3,362,224 | 1/1968 | Melone | 73/327 |
| 3,379,576 | 4/1968 | Matter | 73/327 |
| 3,384,885 | 5/1968 | Forbush | 340/244 R |
| 2,190,027 | 2/1940 | Jordan | 116/118 R |
| 3,553,666 | 1/1971 | Melone | 340/244 R |
| 3,354,316 | 11/1967 | Deverall | 317/235 N |
| 3,648,521 | 3/1972 | Amendolia | 73/293 X |
| 3,466,928 | 9/1969 | Kind | 73/293 |
| 3,713,338 | 1/1973 | Kind | 73/293 |

*Primary Examiner*—Richard C. Queisser
*Assistant Examiner*—Daniel M. Yasich
*Attorney, Agent, or Firm*—Teagno & Toddy

[57] ABSTRACT

A liquid level monitor for monitoring the level of liquids in a remote or shielded container and providing a signal proportional to any one of an infinite number of levels within a given range. The monitor has a sheet sealingly engaging an aperture in the container which extends vertically over the range of levels to be monitored. An external light source provides light which shines upon the light transmitting material. An external lens may be used to direct any light reflected by the light transmitting material, the intensity of which will be inversely proportional to liquid level, to a light receiving station. The light received at the receiving station is then conducted, preferably by means of fiber optics, to a remote monitoring station. The monitoring station may be a visual display or may convert the light received into a signal, proportional to intensity, for use by an indicating or controlling device. The level of liquid in the container and changes thereto may also be used to monitor the stability of the device to which the container is mounted.

20 Claims, 5 Drawing Figures

LIQUID LEVEL MONITOR

BACKGROUND OF THE INVENTION

1. Field of the Invention

This invention relates to liquid level monitors and more particularly relates to a liquid level monitor which is totally external of the container holding the monitored liquid and provides a signal proportional to the liquid level over a given monitored range.

2. Description of the Prior Art

Prior art attempts to monitor liquid levels in remote containers having comprised float devices which were mechanical in nature, somewhat inaccurate, required complicated mechanical linkages and were not totally reliable. Such devices also required a movable member to be in the fluid reservoir which might be highly undesirable with certain volatile fluids. When accuracy and reliablility were required, such as in the monitoring of liquid levels in automobile and truck reservoirs for brake fluid, radiator fluid, power steering fluid, battery fluid and the like, the use of passive optical devices became popular. Such optical liquid level monitoring or indicating devices are desirable as no moving parts are required. However, the optical liquid level sensors of the prior art have not been satisfactory as they generally relied on the use of prisms with their inherent loss of signal strength caused by multiple reflections. Furthermore, a single prism was capable of indicating the presence of liquid at a specific level only. For an incremental indication, a series of prisms was required at various levels with a complicated orientation pattern at the viewing station. The prior art optical devices were also generally unsatisfactory as they did not provide a signal proportional to liquid level which may be used for indication or control purposes in a closed loop feed back system. Additionally, these prior art devices were unsatisfactory as they were partially internal to the container which reduced the container's fluid holding capacity and increased hazards with certain volatile fluids. Other optical liquid level indication systems, such as is seen in U. S. Pat. No. 3,466,928, depend upon the light absorbing or transmitting properties of a liquid by requiring light to pass therethrough and are thus not ideally suited for use with fluids of greatly different opaqueness or fluids, such as oil or other lubricants which tend to become murky with use.

BRIEF SUMMARY OF INVENTION

In accordance with the present invention, a liquid level monitor has been provided which overcomes the drawbacks of the prior art to the extent that it is totally external of the liquid container or reservoir and is capable of providing a signal proportional to the monitored liquid levels and utilizes only one reflector surface thereby minimizing signal loss. The liquid level monitor of the present invention is generally unaffected by the light absorbing or transmitting properties of the liquid whose level is being monitored. Briefly, the present invention utilizes a light transmitting material which is sealingly engaged over an aperture in the container or reservoir, the aperture extending vertically over that range of liquid level to be monitored. A light source external of said reservoir, which may utilize fiber optics and/or solid state light emitters to keep all possible electrical energy remote from the reservoir, provides a light which shines upon the light transmitting material. An external lens which may be utilized to improve efficiency directs any light reflected by the light transmitting material, the intensity of which is inversely proportional to liquid level, to a light collector which is also external of the container. The light collector then transmits the collected light to a monitoring station which may be a visual display or may be a device to convert the received light into a proportional electrical signal for use by an indicating or control device. The collected light may be transmitted to a remote station by means of fiber optics and the light transmitting material may be colored for use in a visual display whose indication of liquid level comprises a variation of shades of said color.

Accordingly, it is an object of this invention to provide a new and improved liquid level indicator.

A further object of this invention is to provide an optical liquid level monitor which is external to the liquid container and provides a signal which is proportional to the liquid level in the container over the monitored range.

Another object of the present invention is to provide an optical liquid level monitor which is external of the liquid container and utilizes a single reflecting surface to minimize loss of signal.

Another object of the present invention is to provide an optical liquid level monitor which is generally not affected by variations in the light absorbing qualities of the liquid whose level is being monitored.

These and other objects and advantages of the invention will become apparent from the following detailed description taken in connection with the accompanying drawing.

DETAILED DESCRIPTION OF THE INVENTION

Figure 1:
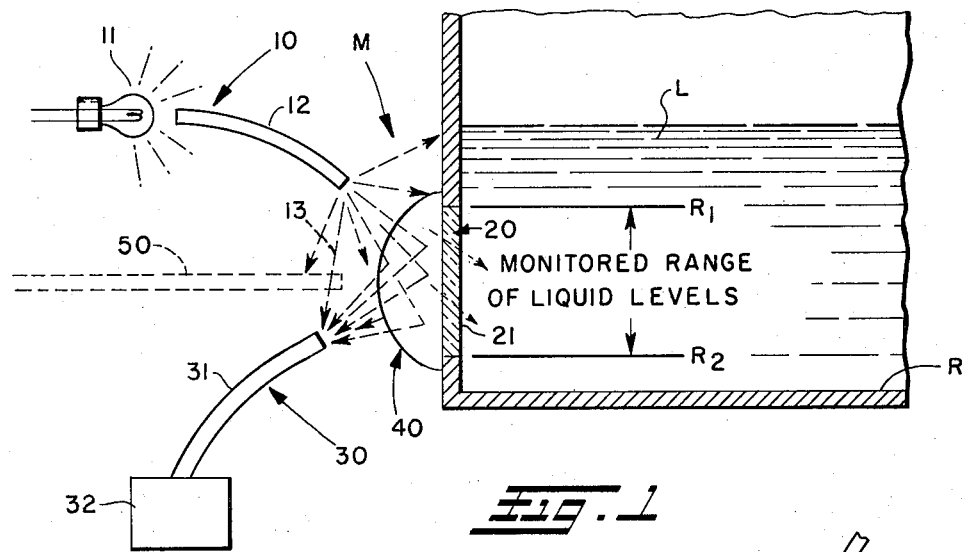
FIG. 1 is a schematic illustration of the present invention.
Figures 2, 3, 5:
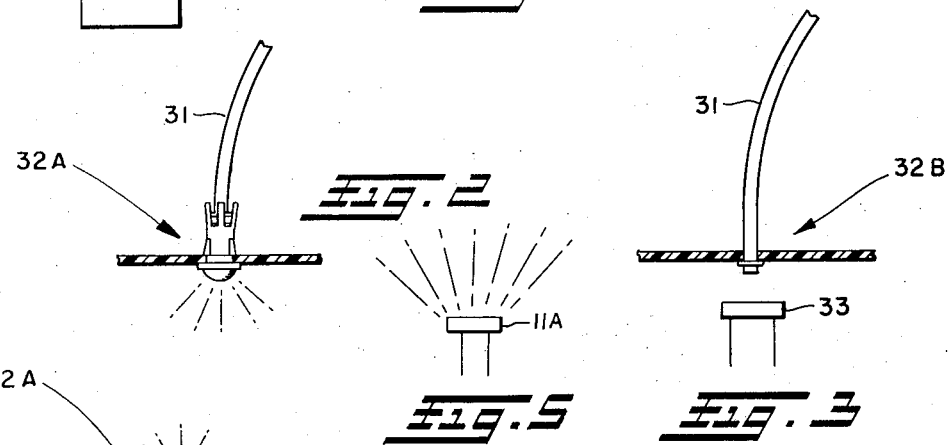
FIG. 2 is a schematic illustration of a visual display utilizing the signal provided by the device of FIG. 1.
FIG. 3 is a schematic illustration of a device for producing a proportional electric signal from the proportional light signal provided by the device of FIG. 1.
FIG. 5 is a schematic illustration of a solid state light emitter.

A schematic illustration of the present invention may be seen by reference to FIGS. 1, 2 and 3. In FIG. 1 a reservoir or container R contains a liquid L whose level is to be monitored over a predetermined range of $R_1$ to $R_2$. In a typical example $R_1$ will be the level corresponding to maximum liquid volume of interest while $R_2$ will be that level corresponding to minimum liquid volume of interest. The liquid level monitor, indicated generally at M, includes a source of light 10, a sheet of light transmitting material 20 which sealingly engages an aperture in the container R which extends vertically over the monitored range, and a light collecting station 30. The monitor M may also include a lens 40 which directs light from source 10 to the light transmitting material 20 and also directs any light reflected by the light transmitting material 20 to the light collector 30. It is to be understood that lens 40 is an optional feature of the present invention and that with some loss in efficiency the light direction function may be obtained by proper positioning of source 10, light transmitting material 20 and collecting station 30.

The source of light 10 may be simply an incadescent bulb which shines directly on the light transmitting materials 20 may comprise a light emitter 11 which is remote from reservoir R and a fiber optics light conducting member 12 which will conduct light from emitter 11 to light transmitting material 20. The emitter may be an incandescent bulb, a solid state light emitter 11A as is shown in FIG. 5 or the like. The use of remote light sources and/or solid state light emission is especially desirable when liquid L is unstable or volatile in nature.

The sheet of light transmitting material 20 forms a substantially vertical window, preferably of constant horizontal dimension, into reservoir R and extends vertically over the range, $R_1$ to $R_2$ of liquid levels to be monitored. The light transmitting materials may be clear or colored when used with a visual indicating system as will be discussed below. The light transmitting material is of a material, as is well known in the art and discussed in U.S. Pat. No. 2,190,027 having an index of refraction that will reflect light if exposed to air or gas at its interior surface 21 but will transmit light if exposed to liquid at its interior surface. Thus, the quantity of light reflected is proportional to the liquid level over the monitored range $R_1$ to $R_2$.

Lens 40, which is optional as discussed above, serves to direct light 13 from the source 10 evenly onto light transmitting material 20 and to direct reflected light 14 from light transmitting material 20 to the collecting station 30. Collecting station 30 is preferably a fiber optics conducting member 31 which leads to a remote monitoring station. Lens 40 and light transmitting material 20 may be formed as a one-piece unit for ease of assembly and to assure proper optical dimensional relationship therebetween.

One form of remote monitoring station may be seen by reference to FIG. 2 which schematically illustrates a visual monitoring station 32A. When a visual monitoring device is utilized light transmitting material 20 is generally of a colored material, for example, red. As can be seen from FIG. 1, a portion of light, preferably white, enters the optical collecting station 30 directly from the source 10. In operation, for all liquid levels above $R_1$, all light which shines on light transmitting material is transmitted, and thus only the uncolored light 13 is seen at the visual monitor. However, as liquid level begins to drop below $R_1$, a portion of red light is reflected. This red light combines with the white light to form various combinations ranging from white to pink to red as the liquid level drops. The visual monitor 32A thus provides a visual signal the shade of which is proportional to liquid level.

The device described in the above paragraph is also especially well suited as a stabilization monitor. By providing a container filled to level $R_1$ which is firmly fixed to any device to be monitored the stabilization will be indicated by flashing signals at 32A as motion causes the level of liquid contacting the interior surface 21 of the light transmitting material to vary. The range of color variations seen will give an indication of the intensity of the instability while the number of color changes will indicate the cyclical frequency of the instability. Various counting and/or recording devices may be used to record the instability.

FIG. 3 illustrates an electrical signal output monitoring station 32B. In this system a shield 50, shown in dotted lines in FIG. 1, is used to shield the collecting station 30 from the source 10. With the collection station thus shielded the only light transmitted to the monitoring station 32B is that light reflected by light transmitting material 20 the intensity of which is inversely proportional to the liquid level between $R_1$ and $R_2$. The proportional signal received at 32B is converted into a proportion electrical signal by any member of suitable means which is commercially available such as photocell 33 or the like. The electrical signal may of course be used for any indicating, display and/or control function as is well known in the art.

Figure 4:
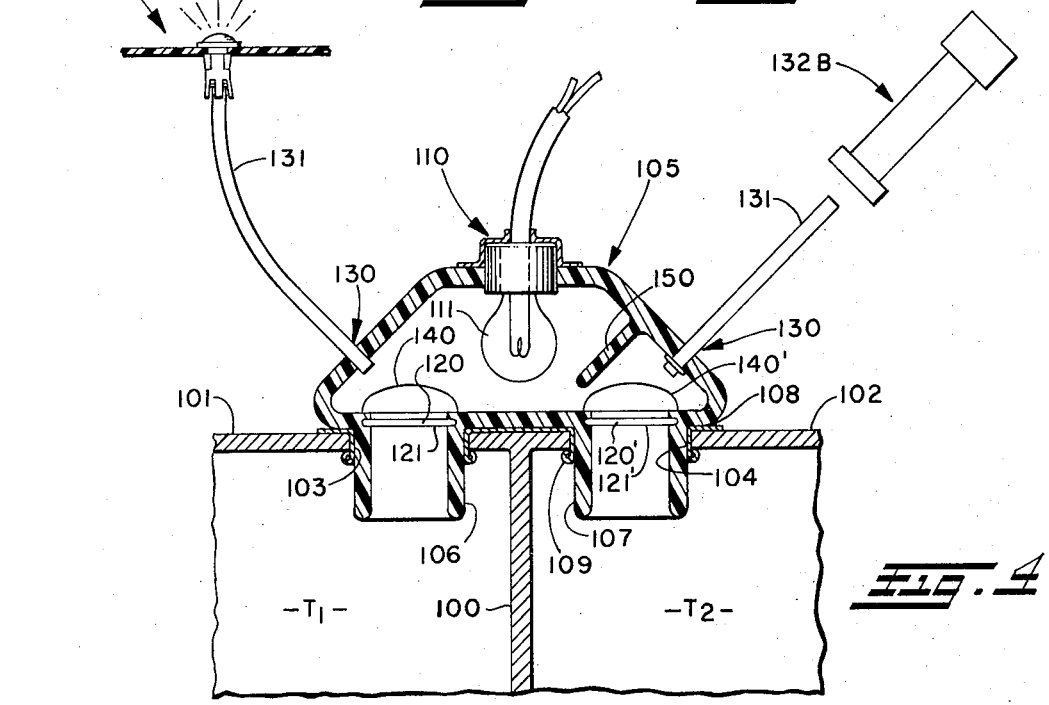
FIG. 4 is a top sectional view of one form of the present invention as utilized in monitoring the level of brake fluid in twin side-by-side tanks.

FIG. 4 illustrates an embodiment of the present invention utilized to monitor the level of liquids in two side-by-side tanks such as are used to contain the brake fluid of an automobile, truck or the like. Tanks T1 and T2 are illustrated as having a common vertical side wall 100 and aligned vertical front walls 101 and 102 respectively. Spaced substantially horizontally equidistant from side wall 100 each front wall has an aperture 103 and 104 respectively which extends vertically over that range of fluid levels to be monitored. Adapted for mounting in a fluid sealing relation with tanks T1 and T2 is a twin tank liquid level monitor 105 which may be totally encapsulated. The monitor 102 includes twin cup-like projections 106 and 107 which protrude into apertures 103 and 104 and sealingly engage same. A fluid sealing layer 108 may be utilized to perfect the fluid sealing relation between the tanks and the monitor. Fasteners such as are seen at 109 may be utilized to firmly mount the monitor.

The monitor 105 includes a light source 110 which may be incandescent lamp 111 or a solid state light emitter if required. The single light source 110 is utilized to monitor both right hand tank T2 and left hand tank T1. For purposes of illustration right hand tank T2 will be monitored by an electrical monitoring device 132B while the left hand tank T2 will be monitored by a visual display monitor 132A.

The left hand monitoring device includes a colored sheet of light transmitting material 120, the interior surface 121 of which is in fluid communication with the fluid in tank T1. The lens 140 directs reflected light from light transmitting material 120 to the light collecting station 130 which is also exposed to light 113 directly from light source 110. A fiber optics conducting device 131 leads to the visual display monitor 132A. It may be seen that the left hand tank monitor operates identically to that discussed above for FIG. 2 and a detailed explanation of operational details may be had by reference thereto.

The right hand monitoring device includes an uncolore sheet of light transmitting material 120'. The interior surface 121 of which is exposed to fluid in tank T2. A lens 140' directs light reflected from light transmitting material 120' to collecting station 130 from which the light is transmitted to electrical monitoring device 132B. A shield 150 blocks the right hand collecting station from light source 110. As this device operates identically to that discuseed for FIG. 3 above, a detailed discussion of operational details may be had by reference thereto.

Although this invention has been described in its preferred form with a certain degree of particularity, it is understood that the present disclosure of the preferred

I claim:

1. A device for providing an electrical signal substantially proportional to liquid level, over a predetermined range, in a container, said device comprising:
   a light transmitting sheet member sealingly engaging a substantially vertical aperture in said container, said aperture extending vertically over the predetermined range and being of substantially constant horizontal dimension, said sheet member being of a material which will reflect external light if exposed to gas at its interior surface and will transmit external light if exposed to liquid at its interior surface;
   a source of light external of said container for supplying a substantially equal intensity of light upon the exterior surface area of said sheet member;
   a light collection station mounted to said sheet member external of said container for collecting the light reflected by said sheet member;
   a shield for shielding said collection station from said source;
   a monitoring station in optical communication with said collection station, said monitoring station including means for providing an electric signal proportional to the intensity of light reflected from said sheet member and
   means for optically interconnecting communicating said collection station and said monitoring station.

2. The device of claim 1 additionally comprising a lens integrally formed with said light transmitting member and mounted exteriorly of said container for directing substantially all of the light reflected by the exterior surface of said sheet member to said collection station.

3. The device of claim 2 wherein the means of optical communication between monitoring and collecting station comprises a fiber optics conducting member.

4. The device of claim 2 wherein said member is oriented substantially vertically with respect to the ground, said aperture being of a substantially constant horizontal dimension whereby said member would reflect and transmit light in a ratio which is substantially proportional to liquid level over the predetermined range.

5. The device of claim 3 wherein said collection station comprises one end of said fiber optics conducting member.

6. The device of claim 3 wherein said source of light is a solid state light emitter.

7. The device of claim 6 wherein said member, said shield, said lens, said collection station and said source of light are formed in a totally encapsulated unit.

8. A device for indicating the level of liquid in a container over a predetermined range, said device comprising:
   a light transmitting sheet member sealingly engaging an aperture in a substantially vertical wall of said container, said aperture extending vertically over said predetermined range, said sheet member of a material which reflects exterior light if exposed to gas at its interior surface and transmits exterior light if exposed to liquid at its interior surface;
   a source of light exterior to said container, said source providing light rays which shine upon the exterior surface of said sheet member;
   a light collection station exterior of said container for receiving light rays reflected by the exterior surface of said sheet member; and
   a lens mounted said sheet member exterior of said container for directing substantially all light reflected by the exterior surface of said sheet member upon said light collection station.

9. The device of claim 8 wherein said aperture is of a substantially constant horizontal dimension whereby said sheet member reflects and transmits light in a ratio which is substantially inversely proportional to liquid level over the predetermined range.

10. The device of claim 9 wherein said lens and said member are formed as a one-piece unit.

11. The device of claim 9 wherein said light collection station is shielded from said source whereby the amount of light collected by said station is substantially inversely proportional to liquid level over the predetermined range.

12. The device of claim 9 wherein said light collection station is the end of a fiber optics conducting member.

13. The device of claim 12 wherein said source of light is the end of a fiber optics conducting member the other end of which is exposed to a light emitter.

14. The device of claim 13 wherein said light emitter is a solid state light emitter.

15. The device of claim 12 wherein said source of light is a solid state light emitter.

16. The device of claim 9 wherein said lens, said member, said source and said collection station are all formed in a single unit.

17. The device of claim 16 wherein said unit is totally encapsulated.

18. A device for visually indicating the level of liquid over a predetermined range in a remote container, said device comprising:
   a sheet of light transmitting material forming a substantially vertical window into said container and extending vertically over the predetermined range, said sheet being of a colored material which colors and reflects exterior light if exposed to gas at its interior surface and transmits exterior light if exposed to liquid at its interior surface;
   a source of substantially uncolored light exterior of said container at least a portion of which shines upon said sheet;
   a light collecting station exterior of said container for collecting light reflected by the exterior surface of said sheet, said light collection station also exposed to a portion of said substantially uncolored light and thus collecting substantially uncolored light when said liquid is at or above the maximum liquid level of the predetermined range and collecting increasingly colored light as said liquid level decreases to the minimum level of the predetermined range; and
   a lens mounted exteriorly of said container for directing substantially all of said reflected colored light to said light collection station.

19. A device for monitoring the liquid level over a given range, in two side-by-side containers, said device comprising:
- a housing adapted for sealing engagement with said containers, said housing having two hollow projections each of which sealingly engage an aperture in the side wall of each container, said apertures extending vertically over the given range;
- sheets of light transmitting material mounted in said projections, said sheets forming windows into said containers and extending over said given range, said sheets of a material which will reflect light shining on one surface if its opposite surface is exposed to gas and will transmit light shining on one surface if its opposite surface is exposed to liquid;
- a single source of light mounted in said housing for providing light rays which shine upon both of said sheets;
- a pair of light collecting stations, one for each sheet, receiving the light reflected by its corresponding sheet; and
- a pair of lens, each one integral with a sheet of light transmitting material and respective light collection station for directing substantially all of the light reflected by a aheet to its respective light collections station.

20. The device of claim 19 wherein said light collection stations comprise ends of separate fiber optics conducting members.

* * * * *

UNITED STATES PATENT OFFICE
CERTIFICATE OF CORRECTION

Patent No. 3,808,887          Dated : 5 May 7, 1974

Inventor(s) Albert T. Buttriss

It is certified that error appears in the above-identified patent and that said Letters Patent are hereby corrected as shown below:

In the Abstract, line 4, after "sheet" insert -- of light transmitting material --. Column 3, line 5, after "20" insert -- of --; line 48, after "material" insert -- 20 --. Column 5, line 32, after "interconnecting" cancel "communicating".

Signed and sealed this 1st day of October 1974.

(SEAL)
Attest:

McCOY M. GIBSON JR.          C. MARSHALL DANN
Attesting Officer            Commissioner of Patents